United States Patent [19]

Mizusawa

[11] 4,391,559
[45] Jul. 5, 1983

[54] PLASTIC FASTENER
[75] Inventor: Akira Mizusawa, Fujisawa, Japan
[73] Assignee: Nifco Inc., Tokyo, Japan
[21] Appl. No.: 173,230
[22] Filed: Jul. 28, 1980
[51] Int. Cl.[3] ............................................. F16B 13/04
[52] U.S. Cl. ........................................ 411/45; 411/41; 411/60
[58] Field of Search ....................... 411/15, 39, 40, 41, 411/44, 45, 46, 48, 57, 78, 60, 394; 24/217 R

[56] References Cited

U.S. PATENT DOCUMENTS

| 1,229,562 | 6/1917 | Willetts | 24/217 R |
| 3,116,528 | 1/1964 | Poe | 411/15 |
| 3,147,525 | 9/1964 | Texier | 411/44 X |
| 3,417,438 | 12/1968 | Schuplin | 411/41 X |
| 4,263,833 | 4/1981 | Loudin et al. | 411/60 X |

FOREIGN PATENT DOCUMENTS

| 1057543 | 7/1979 | Canada | 411/57 |
| 1502520 | 10/1967 | France | 411/373 |
| 884123 | 12/1961 | United Kingdom | 411/57 |
| 916161 | 1/1963 | United Kingdom | 411/373 |
| 1520155 | 8/1978 | United Kingdom | 411/15 |
| 642529 | 1/1979 | U.S.S.R. | 24/217 R |

Primary Examiner—Thomas J. Holko
Attorney, Agent, or Firm—Jerold M. Forsberg; Thomas W. Buckman

[57] ABSTRACT

A plastic fastener comprises a female member provided with a flange, a leg extended from the flange and an insertion hole bored longitudinally along the axis of the leg, and a male member provided with a head portion and a shaft portion extended from the head portion and adapted to be inserted into the insertion hole of the female member, whereby panels are brought into tight union. The female member and the male member are provided on the upper surface of the flange and on the lower surface of the head portion respectively with cam faces which are inclined in the circumferential direction around the common axis of the two members and matched so that these are brought into intimate contact at the time of the forced driving of the male member into the female member and, at the time of release of the tight union of the panels, caused to slide on each other by a rotation given to the male member to thereby cause the head portion to be lifted from the upper surface of the flange. Thus, the plastic fastener makes it possible to easily bring the panels into tight union and to readily release the panels from the tight union.

1 Claim, 4 Drawing Figures

PLASTIC FASTENER

BACKGROUND OF THE INVENTION

This invention relates to a plastic fastener comprising a female member formed of a flange, a leg extended downwardly from the lower side of the flange and adapted to permit increase in the outside diameter of its barrel portion and an insertion hole bored along the axis of the leg downwardly from the upper surface of the flange, and a male member formed of a head portion and a shaft portion extended downwardly from the lower side of the head portion and adapted to be forcibly driven into the insertion hole of the female member. More particularly, this invention relates to a plastic fastener of the type comprising a female member and a male member as described above, which plastic fastener is improved so that after it has joined two panels face to face with the shaft portion of the male member forcibly driven into the insertion hole of the female member, it permits extraction of the tightly inserted shaft portion required for the purpose of separating the panels from their tight union to be readily accomplished.

The fastener described above which comprises the female and male members is used as for uniting two panels face to face or fastening to a panel a metal piece fitted on a part, for example. Use of this fastener is generally effected, as when a plurality of panels are required to be united in a stratified manner, for example, by inserting the leg of the female member through perforations formed at exactly corresponding positions through the individual panels until the flange collides with one outermost panel surface, then forcibly driving the shaft portion of the male member into the insertion hole of the female member thereby radially expanding the portion of the leg protruding from the perforations, causing the panels to be squeezed between the radially expanded portion of the leg and the flange and tightly united with one another. In this case, it is a general practice that the shaft portion of the male member is forcibly driven into the insertion hole of the female member until it is completely buried therein, namely, until the head portion collides with the upper surface of the flange, so that it will not easily come off the insertion hole. Once the union of panels by this fastener is completed, therefore, this union is not broken by ordinary vibrations, impulses and other similar external forces. There are, however, cases where this union must be broken for some reason or other.

SUMMARY OF THE INVENTION

The primary object of the present invention is to provide a fastener which is improved so that when the united panels are desired to be separated from one another, the forcibly driven shaft portion can be easily pulled out to effect the breakage of the union without causing any damage to the fastener.

To attain the object described above, according to the present invention, there is provided a fastener having a construction such that the upper surface of the flange of the female member and the lower surface of the head portion of the male member which are destined to come into mutual contact when the union of panels is effected are formed in mutually engaging cam faces, whereby the breakage of the union is accomplished by rotating the male member relative to the female member which has engaged with the edge of the perforations of the panels and consequently causing the engaging cam faces to slide on each other, permitting the head portion of the male member to rise from the upper surface of the flange of the female member owing to the inclinations of the cam faces and readying this male member for extraction from the female member.

In other words, this invention, when the union of panels obtainable by forcibly driving the shaft portion of the male member into the insertion hole of the female member is enhanced by bringing the female member and the male member into mutual snapped engagement besides making the aforementioned forced driving of the shaft portion, provides effective means for breaking this snapped engagement.

Other objects and characteristic features of this invention will become apparent from a description to be given hereinafter in detail with reference to the accompanying drawing.

DESCRIPTION OF PREFERRED EMBODIMENTS

Figure 3:
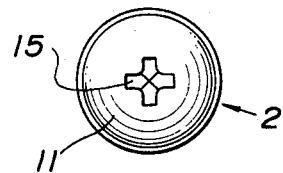
FIG. 3 is a plan view of the fastener of FIG. 1.

Now, the present invention will be described below with reference to the accompanying drawing. In the preferred embodiment illustrated in FIGS. 1-3, 1 denotes a female member, 2 a male member, and 3, 3' denote panels to be united by the combination of these two members described later.

Figure 1:
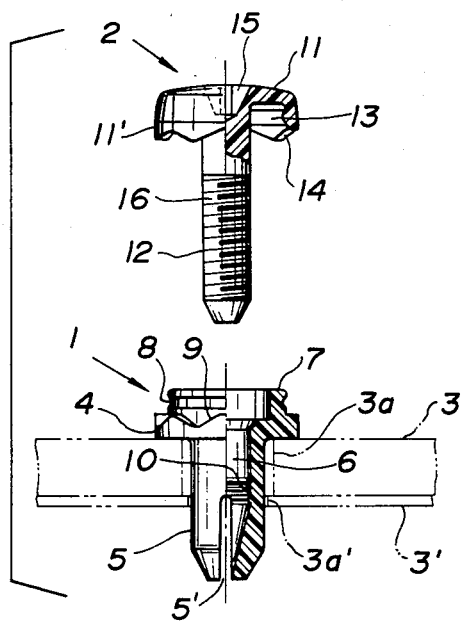
FIG. 1 is a partially sectioned front view of one embodiment of the fastener according to this invention, with the female and male members thereof held in a mutually separated state.

As illustrated in the exploded view of FIG. 1, the female member 1 is provided with a flange 4 of the shape of a disc, a leg 5 extended downwardly from the lower side of the flange and a through insertion hole 6 extending from the upper surface of the flange, through the axis of the leg, to the end of the leg. The flange 4 is provided at the upper central portion thereof with a short, cylindrical boss portion 7 and on the outer wall surface of the boss portion with an annular fitting recess 8. The upper surface of the flange which avoids the boss portion is formed in the shape of a cam face 9 undulated in the circumferential direction around the boss portion. The leg 5 has its lower end sharply tapered, and the lower end of the leg is divided and rendered expansible with a slit 5' inserted in the longitudinal direction along the insertion hole 6. At the same time, the insertion hole 6 which extends as far as the leading end of the leg has its inside diameter gradually decreased toward the end of the leg. Further, on the inner wall surface of the insertion hole 6 which avoids the slit 5', the present embodiment is provided with several ridges 10 formed in a helical direction and intended as a guide for aiding in the extraction of the male member as described later.

The male member 2 forms a unit set in conjunction with the female member 1 and cooperates therewith to unite the aforementioned panels 3, 3' to each other. It is composed of a head portion 11 and a shaft portion 12 extending downwardly from the lower side at the center of the head portion. The head portion 11 is adapted to correspond to the flange 4 of the female member and the shaft portion 12 to the leg 5 respectively. The head portion 11 is formed in the shape of a cap having an outside diameter identical with the outside diameter of the flange 4 and adapted to admit into the interior thereof the boss portion 7 formed on the upper portion of the flange. On the inner wall surface of the interior of the head portion 11, namely the inner wall surface of the rim 11' extended downwardly from the peripheral edge, there is provided an annular fitting protuberance 13 adapted to correspond to the fitting recess 8 of the female member. Further on the lower side of the downwardly extended rim 11', there is provided an undulated cam face 14 conforming to the cam face 9 formed on the upper side of the flange 4 of the female member. At the center on the upper side of the head portion, there is formed an engaging groove 15 adapted to admit the tip of a screw driver to be used in extracting the male member as described fully afterward. The shaft portion 12 which is extended downwardly from the lower side of the head portion is formed in the shape of a bar having a diameter approximately equal to the upper inside diameter of the insertion hole 6 of the female member and is provided on the peripheral surface thereof with helically shaped screw threads 16. It, therefore, has the general appearance of a bolt. When the panels 3, 3' are joined by the fastener, the shaft portion 12 is forcibly driven into the insertion hole 6 of the female member to expand the leg 5. To fulfill this function, therefore, the shaft portion is formed in a length greater than the length of the insertion hole 6, so that when driven into the insertion hole, it protrudes from the lower end of the leg 5.

The female member 1 and the male member 2 which are constructed as described above are separately molded of a plastic material such as nylon which combines suitable flexibility and rigidity. The union of panels by use of this fastener is accomplished by having the two members combined into one piece.

Figure 2:
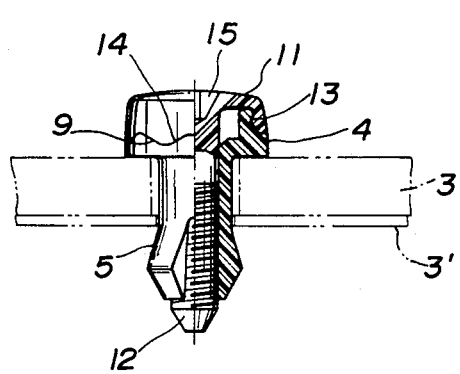
FIG. 2 is a partially sectioned front view of the fastener of FIG. 1, with the female and male members thereof held in a tightly combined state.

Now, the procedure followed in uniting the two panels 3, 3' by use of the fastener of this invention will be described. In the panels, through holes 3a, 3a' for permitting passage of the fastener are perforated in advance. The panels are put together face to face so that the through holes exactly communicate with each other. Then into the joined through holes, the leg 5 of the female member 1 is inserted from one side until the lower side of the flange 4 collides with the panel surface and, at the same time, the divided leg ends of the leg 5 protrude from the other panel surface (as shown in FIG. 1). When this insertion is completed, the shaft portion 12 of the male member 2 is brought toward the insertion hole 6 from above the female member, then forced into the insertion hole against the resistance offered by the ridges 10 formed on the inner wall surface of the insertion hole and the gradually decreased inside diameter of the insertion hole in the lower portion thereof and eventually allowed to protrude from the lower end of the leg. At the same time, the cap-shaped head portion 11 is pushed down on the upper side of the flange to admit the boss portion 7 therein, bring the fitting recess 8 and protuberance 13 into intimate engagement and establish intimate contact between the cam face 9 formed on the upper side of the flange 4 and the cam face 14 formed on the lower side of the downwardly extended rim 11'. Consequently, the panels 3, 3' put together as described above are fastened tightly to each other (as shown in FIG. 2). In this case, the fitting recess 8 and fitting protuberance 13 snap into engagement under the pressure applied to the head portion 11. The shock generated by this engagement and transmitted to the finger tip placed on the head portion 11 enables the operator to perceive that the leading end of the shaft portion 12 has reached the lower end of the leg 5 and expanded the lower end of the leg which is split with the slit 5'. The engagement established between the fitting recess and the fitting protuberance prevents the shaft portion from accidentally slipping out of the insertion hole and keeps the panels in tight union. If the cam faces 9, 14 happen to deviate from their exactly opposed positions while the fitting recess and fitting protuberance are in the process of going into mutual engagement, the inclined surfaces of the cam faces slide on each other immediately before the mutual engagement is made, causing the whole male member to rotate about its axis. As the fitting recess and the fitting protuberance are consequently brought into intimate mutual engagement, the cam faces are correctly joined into tight contact.

Because the shaft portion 12 is forcibly secured in position within the insertion hole 6, because in the present embodiment, the fitting protuberance 13 formed on the head portion is kept in fast engagement with the fitting recess 8 and further because the screw threads 16 formed on the peripheral surface of the shaft portion are kept in engagement with the ridges 10 formed within the insertion hole, the female and male members which have been combined into one piece and consequently fastened the panels 3, 3' to each other do not easily dissolve the union of the panels by permitting themselves to be separated from each other. When the tip of a screw driver is fitted into the engaging groove 15 formed on the head portion 11 of the male member 2 forcibly inserted into the female member and the screw driver is rotated to turn the head portion 11, the cam faces 9, 14 kept in intimate mutual contact slide on their respective inclined surfaces and cause the head portion 11 to rise from the upper surface of the flange 4 and separate the fitting recess from the fitting protuberance. Consequently, the shaft portion 12 which has so far kept the lower end of the leg 5 in its expanded state rises up the insertion hole. By inserting the tip of the screw driver in the space formed between the raised head portion 11 and the flange 4 and then moving the screw driver in the manner of a lever, the male member can be drawn out of the female member. Moreover, in the case of the present embodiment which involves establishment of tight engagement between the screw threads formed on the peripheral surface of the shaft portion and the ridges 10 formed in the helical direction on the inner wall surface of the insertion hole 6, the shaft portion can be drawn out of the insertion hole with the ridges serving as the guide when the rotation of the head portion by means of the screw driver is continued. The extraction of the shaft portion dissolves the union of the two members of the fastener and releases the panels from their tight union.

In short, in the fasteners of the type having a construction such that panels put together face to face, for example, are joined by forcibly driving the shaft portion of the male member into the insertion hole of the female member, the conventional version causes the forcibly driven male member to be so tightly joined with the female member as to render subsequent mutual separation of the two members hardly practicable, whereas the fastener of the present invention provides mutually conforming cam faces one each for the flange of the female member and the head portion of the male member so that, when the two members are joined, these cam faces are brought into intimate contact with each other and, when the two members are desired to be mutually separated, a rotation given to the head portion suffices for dissolving the intimate contact of the cam faces and putting an impetus for the extraction of the male member. Thus, the fastener of the present invention readily accomplishes desired separation of the two members from their joined state and release of the panels from their tight union.

Figure 4:
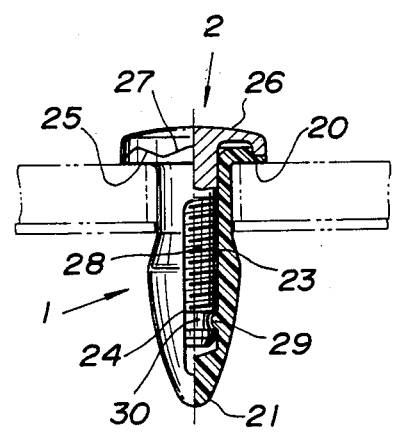
FIG. 4 is a partially sectioned front view of another embodiment of the fastener according to this invention, with the female and male members thereof held in a tightly combined state.

FIG. 4 illustrates another embodiment of the fastener according to this invention. This embodiment represents a modification characterized by the special shape in which the leg portion of the female member is formed and by the arrangement in which the fitting recess and fitting protuberance serving the purpose of bringing the female member 1 and the male member 2 into a snapping engagement are formed inside the insertion hole of the female and on the shaft portion of the male member respectively.

Specifically in the present embodiment, the female member 1 is composed of a flange 20, a leg 21 of the shape of a bullet extended downwardly from the lower side of the flange 20 and provided with a blind insertion hole 23 bored into the interior of the leg 21 downwardly from the upper surface of the flange, slits 24 cut longitudinally in the enclosing wall of the leg so as to render the leg both contractable and expandable and a cam face 25 of undulated cross section formed on the flange 20, while the male member 2 is composed of a head portion 26 of the shape of a shallow cap having a descending brim, a cam face 27 of undulated cross section formed on the lower surface of the descending brim of the head portion 26 and adapted to conform to the cam face 25 of the flange of the female member, and a shaft portion 28 extended downwardly from the center of the lower side of the head portion 26 and provided on the peripheral surface thereof with screw threads. In addition, an annular fitting protuberance 29 is formed on the inner wall surface of the insertion hole bored in the interior of the leg 21 of the female member and a fitting recess 30 conforming to the protuberance is formed on the peripheral surface of the shaft portion 28 of the male member.

The female and male members 1, 2 of the present embodiment, similarly to the first embodiment described above, accomplish fast union of panels by having the shaft portion 28 of the male member forcibly driven into the insertion hole 23 of the female member. The present embodiment is differentiated from the first embodiment by the fact that the leg 21 is temporarily contracted radially by virtue of the resilience of the material used and the deformability of the slits 24 formed so as to be inserted through the holes 3a, 3a' perforated in the panels and, upon completion of this insertion, allowed to resume its original shape and consequently brought into temporary attachment to the panels and the fact that tight union of the two members obtained by the forcible insertion of the shaft portion 28 into the insertion hole 23 is further enhanced by bringing the fitting protuberance 29 and fitting recess 30 into snapping engagement. The two embodiments, however, are entirely identical in respect that the cam face 25 formed on the upper side of the flange 20 and the cam face 27 formed on the lower surface of the descending brim of the head portion 26 are brought into engagement in the form of intimate contact by the forced insertion of the shaft portion.

In the case of the present embodiment, therefore, fast union of the panels is accomplished by the forced insertion of the shaft portion and, at the time of this forced insertion, the fitting protuberance and fitting recess are caused to snap into tight combination. The shock generated upon the completion of this combination is perceived by the finger tip placed on the head portion of the male member. In the extraction of the shaft portion, a rotation given as described above to the head portion 26 causes the cam faces 25, 27 so far kept in intimate contact with each other to slide on each other and, consequently, pushes up the head portion and gives rise to a gap between the head portion 26 and the flange 20 and, at the same time, dissolves the engagement between the fitting protuberance and fitting recess. Then, the male member is ready for easy removal from the insertion hole. If, in the present embodiment, the insertion hole is provided on the inner wall surface thereof with ridges formed in the helical direction and adapted to be meshed with the screw threads formed on the peripheral surface of the shaft portion 28, a continuance given to the aforementioned rotation of the head portion enables the extraction of the male member to be effected readily with the ridges serving as the guide.

So far the present invention has been described with respect to embodiments wherein the male member is provided on the peripheral surface of the shaft portion thereof with screw threads, while the female member is provided on the inner wall surface of the insertion hole thereof with helical ridges adapted to be meshed with the screw threads on the shaft portion of the male member. For this invention, provision of such screw threads and ridges is not an indispensable requirement. The shaft portion of the male member and the inner wall surface of the insertion hole in the female member may be devoid of surface irregularities. In the case of an embodiment which lacks such ridges, while the union of panels 3a, 3a' is effected in the same way as in the aforementioned two embodiments, the disengagement of the panels is accomplished by a different procedure of giving a rotation to the head portion of the male member and raising the male member from the female member through the medium of cam means thereby dissolving the tight union of the female and male members and, thereafter, simply causing the male member to be extracted by a pull given to the head portion with finger tips.

As described in the various embodiments, the male member is destined to be rotated about its axis for the disengagement of the union thereof with the female member. For the female member not to follow the movement of the male member during this rotation, it is desired to be amply secured in the perforations. Since the work of rotation given to the male member constitutes a precondition for the release of the male member from the fast combination thereof with the female member, the release cannot be obtained if the female member is suffered to follow the movement of the male member during this work of rotation. For advantageous application of the fastener of this invention, the through holes perforated in the panels may be formed in an angular shape and the leg portion of the female member, especially the part of the leg portion to be received in the through holes during the insertion of the female member into the holes, may be formed in a matched angular shape, so that the female member will not follow the movement of the male member during the rotation of the male member and that the cam faces will be allowed to slide smoothly on each other.

As described above, this invention provides a matched pair of cam faces, one on the upper surface of the flange of the female member and the other on the lower surface of the head portion of the male member, and brings them into intimate contact with each other at the time of the union of the two members of the fastener. For the extraction of the shaft portion of the male member, therefore, a simple work of giving a rotation to the male member on the front side of the joined panels suffices for enabling the head portion joined intimately face to face with the flange to be separated from the flange thereby readying the male member for subsequent complete removal. The fastener of this invention has another advantage that since this extraction of the male member is accomplished without doing any harm to the two members of the fastener, the fastener can be put to reuse.

In the embodiments cited above, the rotation of the male member has been described as obtained by fitting the tip of a screw driver to the engaging groove formed on the head portion and turning the screw driver to impart a rotation to the head portion. The provision of the engaging groove for effective use of the screw driver is not the only means available for the rotation of the male member. This rotation may otherwise be effectively achieved by forming the head portion of the male member in a polygonal shape, applying a wrench, for example, to the polygonal head portion and revolving the wrench around the head portion. Further, the cam faces on the flange and the head portion have been described as formed in a matched undulated shape. The undulation of the cam faces is no essential requirement for this invention. The cam faces may be formed in any other desired shape, on condition that they are inclined and matched so as to come into intimate contact at the time the two members of the fastener are brought into tight combination.

What is claimed is:

1. A plastic fastener comprising a female member provided with a flange, a leg extended downwardly from the lower side of the flange and adapted to permit increase in the outside diameter of the barrel portion thereof, and an insertion hole bored longitudinally along the axis of the leg downwardly from the upper surface of the flange and a male member provided with a head portion and a shaft portion extended downwardly from the lower side of the head portion and adapted to be inserted into the insertion hole of the female member, whereby panels put together face to face are brought into tight union by inserting the leg of the female member into through holes bored at exactly corresponding position in the panels and subsequently forcibly driving the shaft portion of the male member into the insertion hole of the female member thereby keeping the leg in its radially expanded state, which plastic fastener is characterized by providing on the upper surface of the flange of the female member and on the lower surface of the head portion of the male member respectively a plurality of circumferentially spaced undulating cam surfaces disposed around the common axis of the two members and matched so that cam faces are brought into intimate contact at the time of forced driving of the male member and, at the time of release of the fast union of the panels, the cam faces are caused to slide on each other by a rotation of the male member and consequently the head portion of the male member is lifted from the upper surface of the flange of the female member, the shaft portion of the male member having thread configurations formed thereon and at least a portion of the internal wall of the female member including means to threadingly mate with said thread configuration to assist in the retraction of the male member, wherein the flange of the female member has a boss portion of the shape of a short circular column formed at the center on the upper surface thereof, an annular fitting recess formed on the peripheral surface of the boss portion and an undulated cam face formed in the upper surface encircling the boss portion, while the head portion of the male member is formed in the shape of a cap containing a descending rim capable of embracing said boss portion and has a fitting protuberance formed on the inner wall surface of the descending rim of the cap so as to be matched to the fitting recess and an undulated cam face formed on the lower surface of the descending rim so as to be matched to the undulated cam face on the flange, the axial dimension of the fitting recess and the fitting protuberance being substantially equal so as to be functionally interrelated with the undulating cam faces in that relative rotary movement between the male and female members releases the locking interengagement between said protuberance and recess.

* * * * *